(12) United States Patent
Ben-Eli

(10) Patent No.: US 8,280,365 B1
(45) Date of Patent: *Oct. 2, 2012

(54) METHOD AND APPARATUS FOR SEARCHING FOR A BASE STATION USING AN ADAPTABLE SEARCH WINDOW

(75) Inventor: David Ben-Eli, Modiin (IL)

(73) Assignee: Marvell International Ltd., Hamilton (BM)

( * ) Notice: Subject to any disclaimer, the term of this patent is extended or adjusted under 35 U.S.C. 154(b) by 498 days.

This patent is subject to a terminal disclaimer.

(21) Appl. No.: 12/155,219

(22) Filed: May 30, 2008

Related U.S. Application Data

(63) Continuation of application No. 10/050,237, filed on Jan. 15, 2002, now Pat. No. 7,392,045.

(51) Int. Cl.
*H04M 11/00* (2006.01)

(52) U.S. Cl. ........................................ 455/421; 455/437

(58) Field of Classification Search .................. 455/101, 455/522, 515, 67.1, 575, 437, 421; 370/330, 370/328
See application file for complete search history.

(56) References Cited

U.S. PATENT DOCUMENTS

| | | | |
|---|---|---|---|
| 5,296,094 A | | 3/1994 | Shan et al. |
| 5,805,648 A | * | 9/1998 | Sutton ........................... 375/367 |
| 6,161,022 A | | 12/2000 | Hwang et al. |
| 6,229,842 B1 | * | 5/2001 | Schulist et al. ................ 375/148 |
| 6,307,878 B1 | | 10/2001 | Sokolov et al. |
| 6,466,606 B1 | * | 10/2002 | Jou ................................. 375/130 |
| 6,510,143 B1 | * | 1/2003 | Bejjani et al. ................. 370/320 |
| 6,526,029 B1 | * | 2/2003 | Zhong ........................... 370/335 |
| 6,738,438 B2 | * | 5/2004 | Rick et al. ..................... 375/343 |
| 6,775,252 B1 | * | 8/2004 | Bayley ........................... 370/328 |
| 2002/0122396 A1 | | 9/2002 | Terasawa |

FOREIGN PATENT DOCUMENTS

GB 2349549 * 11/2000

* cited by examiner

*Primary Examiner* — Nay A Maung
*Assistant Examiner* — Angelica Perez

(57) ABSTRACT

A search receiver in a mobile communicator uses an adaptable search window to search for one or more base stations.

20 Claims, 5 Drawing Sheets

METHOD AND APPARATUS FOR SEARCHING FOR A BASE STATION USING AN ADAPTABLE SEARCH WINDOW

This is a Continuation of application Ser. No. 10/050,237 filed Jan. 15, 2002. The entire disclosure of the prior application is hereby incorporated by reference herein in its entirety.

BACKGROUND

Mobile communicators within cellular communication systems are often required to search for and track one or more base stations within the system during normal operation. Often, a communicator will need to search for and track a number of different base stations simultaneously. As can be appreciated, these base station search functions can consume a significant amount of the computational and time resources of a mobile communicator. These functions may also consume energy resources within the mobile communicator (e.g., by depleting batteries within a handheld communicator). Therefore, there is a general need for base station search techniques and structures that are time, computation, and/or energy efficient.

DETAILED DESCRIPTION OF EMBODIMENTS

Figure 1:
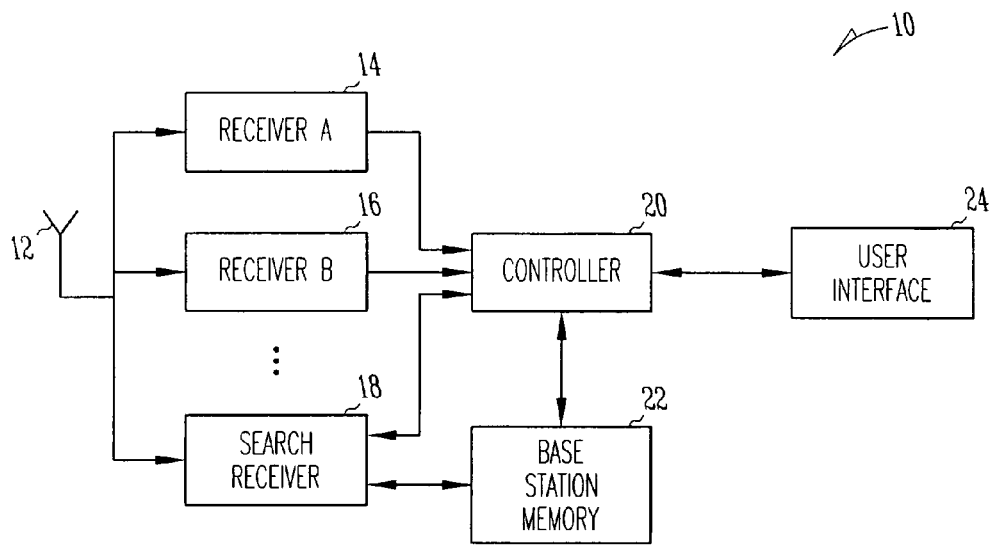
FIG. 1 is a block diagram illustrating a mobile communicator in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating a mobile communicator 10 in accordance with an embodiment of the present invention. The mobile communicator 10 may be used, for example, within a code division multiple access (CDMA) based cellular communication system having a plurality of base stations that provide communication services to mobile users. The mobile communicator 10 may be implemented as any form of mobile communication device or subsystem including, for example, a cellular telephone, a personal digital assistant (PDA), a pager, a portable computer with wireless transceiver functionality, and others. As illustrated, the mobile communicator 10 includes: a receive antenna 12, one or more communication receivers 14, 16 (RECEIVER A, RECEIVER B), a search receiver 18, a controller 20, a base station memory 22, and a user interface 24. Although not illustrated, transmitter functionality may also be provided. It should be understood that the individual blocks illustrated in FIG. 1 (and other block diagrams described herein) are functional in nature and do not necessarily represent discrete hardware structures. For example, in at least one embodiment of the invention, one or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Full hardware implementations, hardware/software hybrid implementations, and other implementations may also be used. As will be appreciated, many alternative communicator architectures may also be used in accordance with the present invention.

The receive antenna 12 is operative for receiving wireless signals from one or more remote base stations. The communication receivers 14, 16 may each be used to process communication signals from a corresponding one of the remote base stations. For example, at a particular time, receiver 14 may be configured to process signals received from an affiliated base station (i.e., a base station that is currently servicing the communicator 10) and receiver 16 may be configured to process signals from a candidate base station (i.e., a base station to which a handoff may subsequently occur). The base stations to which the communication receivers 14, 16 correspond may change with time, particularly when the mobile communicator 10 is in motion. The communication receivers 14, 16 may include rake receiver functionality to process signals from corresponding base stations. The search receiver 18 searches for base stations within range of the mobile communicator 10 using signals received by the antenna 12. The search receiver 18 will also assemble information about the detected base stations and store this information within the base station memory 22. This information may then be used to select, for example, an appropriate base station for call handoff. During an active call, the mobile communicator 10 will normally report its search results to the network and let the network make any handoff decisions. The network then transmits the handoff information back to the mobile communicator 10. The handoff decision is normally autonomous during idle mode.

The user interface 24 provides for communication between the mobile communicator 10 and a user thereof. In this regard, the user interface 24 may include any of a wide variety of different input and output functionality including, for example, a speaker, a microphone, a keypad, a liquid crystal display or touch screen, data conversion functionality, and/or others. The specific types of functionality within the user interface 24 will typically depend upon the type of information being handled by the communicator 10 (e.g., data, voice, video, etc.). The controller 20 is operative for controlling the operation of the receivers 14, 16, 18 and the user interface 24 within the communicator 10. The controller 20 also controls the flow of information between the receivers and the user interface 24. As shown, the controller 20 will typically have access to the information within the base station memory 22 for use in performing control tasks (e.g., making handoff decisions, etc.).

The search receiver 18 searches for each base station of interest to the mobile communicator 10 within a corresponding time window (referred to hereinafter as a search window) associated with the base station. In past systems, a constant length search window was used to search for each individual base station. The search window size was typically dictated by the network for all base stations and would normally be constant throughout a large geographical area. Because the search window length was constant, it was usually based upon the worst case delay spread that was expected to exist within a channel between a base station and a mobile. In conceiving the present invention it was appreciated that, in a typical cellular system, worst case delay spread scenarios are relatively infrequent. Thus, in accordance with the present invention, an adaptable length search window is used within a mobile communicator (e.g., within search receiver 18 of FIG. 1) to search for a base station. That is, the length of the search window is allowed to change with time based on the changing condition of the corresponding channel. In general, the longer the search window that is used to search for a base station, the more system resources (e.g., time, energy, and/or computation resources) that are consumed to perform the search. By using a search window length that is more in line with current channel conditions, a significant reduction in system resource use may be achieved.

The search window for a base station will typically be defined with respect to a given reference point. The reference point for a base station may depend upon such things as the communication protocol being implemented and/or the current status of the base station within the mobile communicator 10. For example, in a system using an IS-95 or CDMA 2000 protocol, the base stations are synchronized and each transmits the same pilot sequence at a different phase offset from the other base stations. The pilot sequence is a known sequence transmitted through the common pilot channel. Mobile units use it to identify the bases and track the channel. Within the mobile, a number of different base station "sets" are typically defined including: an active set, a candidate set, a neighbor set, and a remaining set. The active set identifies one or more base stations (e.g., pilot offsets) that are currently being used for a call within the mobile. The candidate set identifies base stations that are not presently assigned to a call, but are strong enough to be used for a call. The neighbor set identifies base stations that are likely for handoff, but have not been "found" with sufficient quality by the search receiver. The remaining set identifies pilot offsets that exist in the system, and are not in the active, candidate or neighbor sets. In IS-95 or CDMA 2000, active and candidate sets typically use the earliest usable multipath component as the time reference for the search window. For neighbor bases, which might not have a usable path yet, there is a notion of system time, which is set according to a slow tracking of the earliest usable multipath component in the active and candidate set. The search window is then set according to the phase offset of the searched base, relative to the phase of the system time.

In the 3GPP wideband CDMA (WCDMA) system, each base station uses a unique spreading code. Thus, in such a system the search window may be centered about, for example, the earliest meaningful path received by the mobile communicator for the base station of interest (i.e., regardless of the status of the base station). Other techniques for determining the reference point of the search window are also possible. The principles of the present invention can be beneficially implemented regardless of the particular reference point selection technique that is used.

Figure 2:
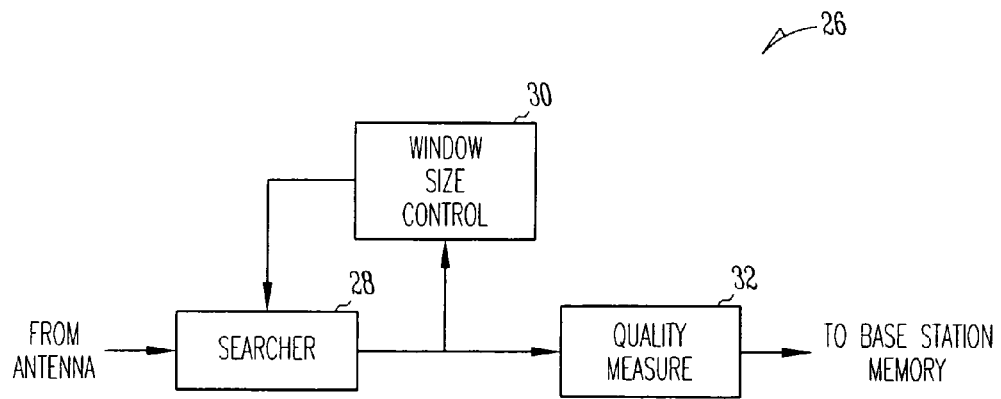
FIG. 2 is a block diagram illustrating functionality within a search receiver in accordance with an embodiment of the present invention.

FIG. 2 is a block diagram illustrating functionality within a search receiver 26 in accordance with an embodiment of the present invention. For ease of illustration and to facilitate understanding, functionality is shown for use in searching for a single base station of interest. It should be appreciated, however, that similar functionality may be provided within a search receiver for each of a plurality of base stations of interest. As illustrated, the search receiver 26 includes: a searcher 28 having a variable search window size, a search window size controller 30, and a quality measure unit 32. The searcher 28 processes a received signal using a time-based search window associated with the corresponding base station. As described above, the search window will typically be defined with respect to a reference point associated with the base station. The search window size controller 30 is operative for varying the size of the search window used by the searcher 28 during device operation in a manner that is designed to reduce the use of system resources (on average) by the base station search function of the corresponding communicator. In at least one embodiment, the search window size controller 30 occasionally (e.g., periodically) changes the search window size of the searcher 28 to a "full" window size to determine, for example, a present channel condition between the corresponding base station and the communicator. The "full" window size may be selected based upon a worst case delay spread that is expected in the channel. The search window size controller 30 then determines a search window size for the searcher 28 for subsequent search activity based on the result of the full window search. Thus, the size of the search window adapts based on the changing condition of the channel.

The quality measure unit 32 is operative for determining and tracking a quality measure of the associated base station, based on the output of the searcher 28. In a system using CDMA, for example, the quality measure unit 32 may use the information output by the searcher 28 to derive relative strength information for the corresponding base station. Other quality measures may alternatively be tracked. The quality measure information determined by the quality measure unit 32 may then be stored within a memory unit for subsequent use (e.g., base station memory 22 of FIG. 1).

Figure 3A:
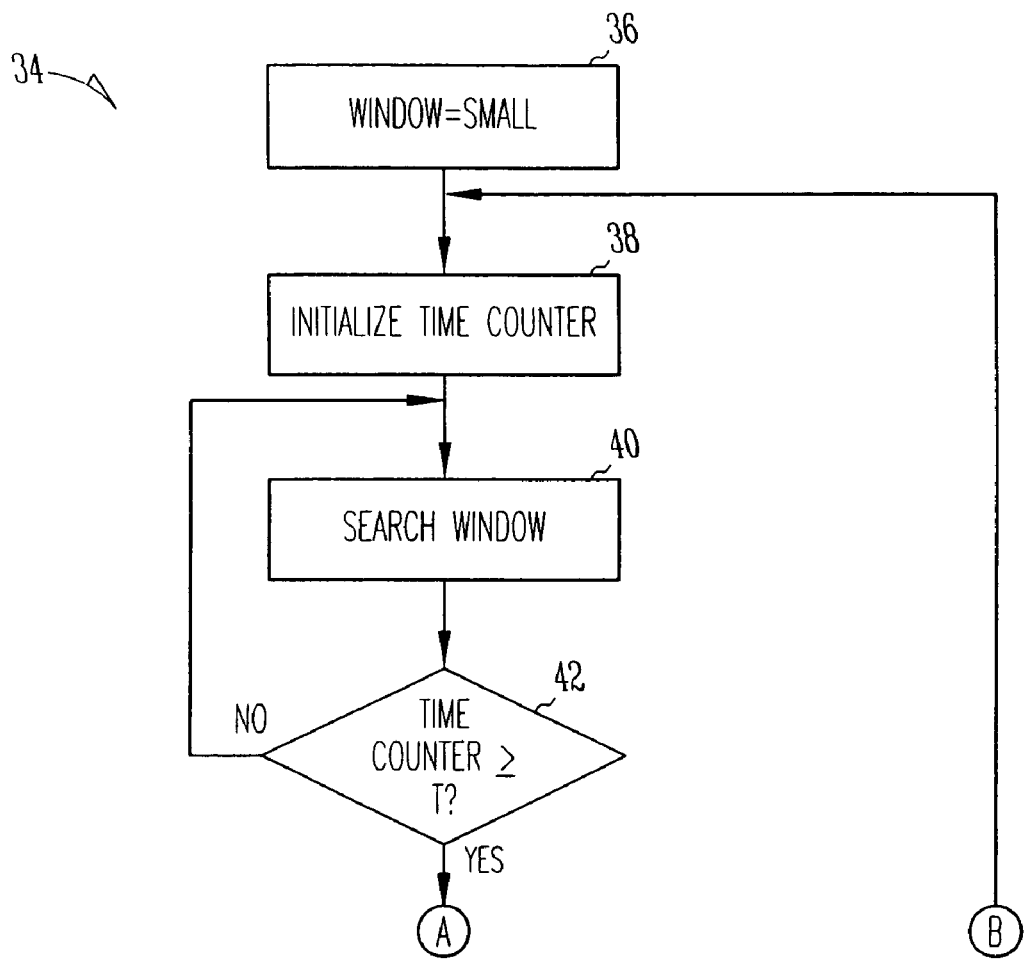
FIGS. 3A and 3B are portions of a flowchart illustrating a process for searching for a base station using an adaptable length search window in accordance with an embodiment of the present invention.
Figure 3B:
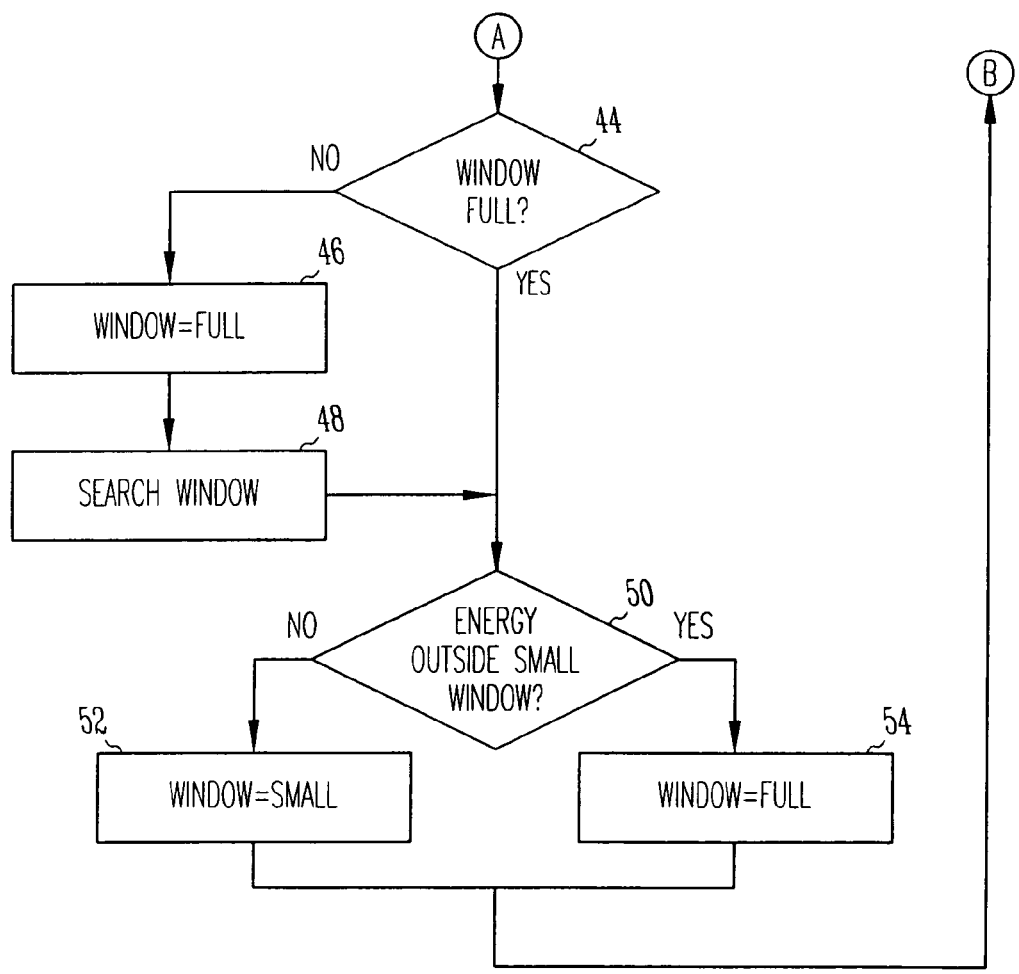

FIGS. 3A and 3B are portions of a flowchart illustrating a process 34 for searching for a base station using an adaptable length search window in accordance with an embodiment of the present invention. The process 34 (as well as the other processes described below) may be practiced within, for example, the mobile communicator 10 of FIG. 1 as well as in communicators having other architectures. The process 34 may be performed for each base station being searched by a particular communicator. In general, the process 34 uses a small search window size (SMALL) during normal operation. The small search window size is preferably selected to encompass most of the delay spread scenarios that are possible between the base station and the mobile (i.e., not worst case scenarios). Occasionally, a search is performed using a full search window size (FULL). As described above, this full search window size may be selected based upon a worst case delay spread that is expected in the channel between the base station and the mobile. The result of the full window search is used to determine whether significant energy exists outside of the small search window size for the base station. If significant energy does exist outside the small search window size, subsequent searching is performed at the larger search window size. If significant energy does not exist outside of the small search window size, subsequent searching is performed at the small search window size. In one approach, significant energy is considered to exist outside the small search window size when one or more paths of a multipath channel are detected outside the small search window that have magnitudes exceeding a predetermined threshold level. In another approach, significant energy is considered to exist outside the small search window size when the sum of the energies of all the detected paths outside the small search window exceeds a predetermined threshold level.

Referring now to FIG. 3A, the search window size (WINDOW) that will be used to search for the base station is set to SMALL (block 36). A time counter is then initialized to zero or some other reference value (block 38). A search is next performed for the base station using the current search window size (block 40). The search is then repeated until the time counter has reached a predetermined value T (block 42). It should be appreciated that the value of T may be modified over time based on one or more variables (e.g., mobile speed, etc.). With reference to FIG. 3B, it is next determined whether the current search window size is equal to FULL (block 44). Because the search window size is not equal to FULL at this point in the process, the search window size is changed to FULL (block 46) and a full window search is performed (block 48). It is next determined whether any significant receive energy has been detected for the base station outside of the small search window during the full window search (block 50). If no such energy has been detected, the search window size is changed back to SMALL (block 52). If energy has been detected outside of the small search window, the search window remains at FULL (block 54). The process 34 is then repeated using the updated search window size (i.e., either SMALL or FULL). The time counter is again initialized (block 38) and searches are performed using the updated search window size until the time counter has again reached T (blocks 40 and 42).

At this point, it is again determined whether the current search window size is FULL (block 44). If not, the search window size is changed to FULL (block 46), another search is performed (block 48), and it is determined whether any significant receive energy has been detected outside of the small search window (block 50). If the latest search window size is FULL, on the other hand, it is immediately determined whether any significant receive energy has been detected outside of the small search window (e.g., using the last search during interval T). As before, if no energy has been detected outside of the small search window, the search window size is changed to SMALL (block 52), otherwise the search window remains at FULL (block 54). The process 34 then repeats as described above.

Instead of checking the status of the current search window in block 44, a full window search (e.g., blocks 46 and 48) may be performed for each cycle of the process 34, regardless of current search window size. As described above, in the illustrated embodiment, the decision to change to the small search window size is made based upon the single full window search of block 48. In an alternative approach, the decision to change to the small search window size is made only after N consecutive full window searches do not find significant energy outside the small search window. In this manner, the chances of changing to the small search window size based on a temporary reduction in detected energy caused by momentary fading, is reduced. In one embodiment of the invention, the method 34 of FIGS. 3A and 3B is modified by starting the process at block 46 (initializing the search window to FULL) and by ignoring the search window initialization of block 36. Thus, the search receiver will first check the full search window for energy outside the small search window and then change to the small search window if no significant energy is detected.

Figure 4A:
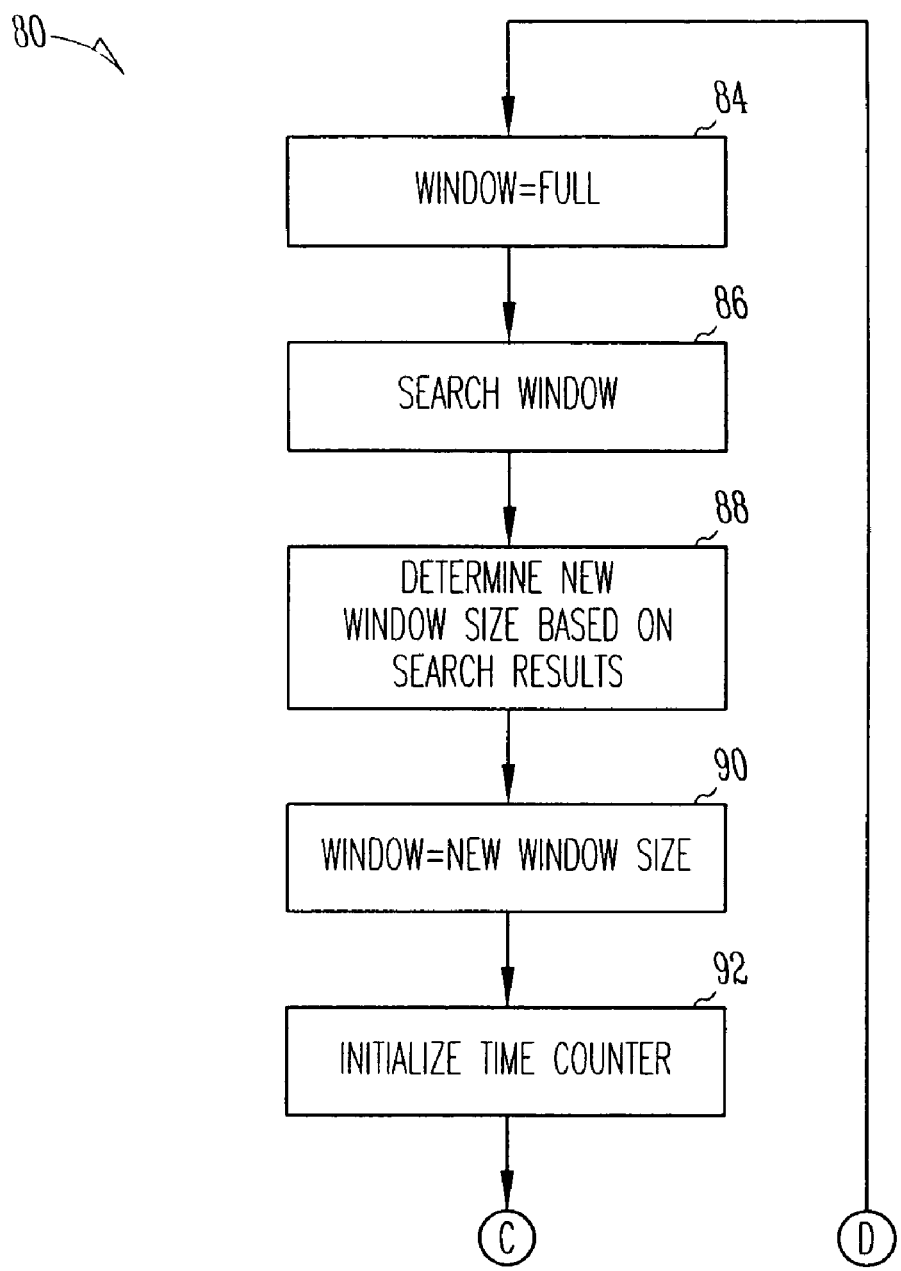
FIGS. 4A and 4B are portions of a flowchart illustrating a process for searching for a base station using an adaptable length search window in accordance with another embodiment of the present invention.
Figure 4B:
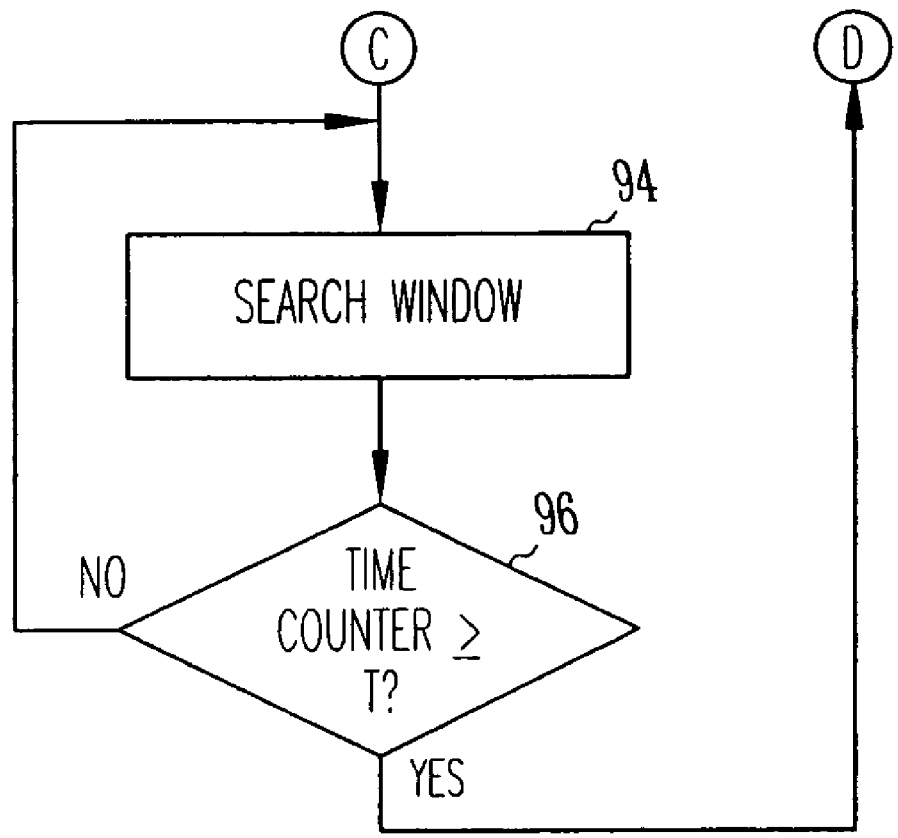

FIGS. 4A and 4B are portions of a flowchart illustrating a process 80 for searching for a base station using an adaptable length search window in accordance with another embodiment of the present invention. With reference to FIG. 4A, the search window size is set to FULL (block 84) and a full window search is performed for the base station (block 86). A new search window size is next determined based on the results of the full window search (block 88). This determination can be made in any of a variety of ways. In one approach, for example, a delay spread of the channel is estimated using the results of the full window search. A smallest search window size may then be found that will encompass all significant energy within the estimated delay spread. The smallest search window size may be selected, for example, from a plurality of predefined search window sizes. Alternatively, the smallest search window size may be directly calculated by the earliest and latest usable detected paths. As will be appreciated, other techniques for determining a new search window size may also be used. As before, the decision to change to a new search window size may alternatively be based upon a plurality of consecutive full window searches. Also, the initial search window size of block 84 may be given a variety of sizes, based on speed, time, in a cyclic fashion, based on the results of previous searches, or a combination thereof. After the new search window size has been determined, the search window is set accordingly (block 90) and a time counter is initialized (block 92). With reference to FIG. 4B, searches are then performed until the time counter has reached a value of T (blocks 94 and 96). The process 80 is then repeated. As before, the value of T may change over time based on, for example, one or more variables.

It should be appreciated that other variables may also effect the determination of the new search window size, in addition to the results of the full window search. This may include, for example, cell size (e.g., macro, micro, or pico cell). Typically, a larger cell size will result in a larger delay spread. Usage of repeaters can also influence this parameter. These other variables may be taken into account in the search window size determination in accordance with the present invention.

In the processes described above, a time counter approach is used to limit a period during which searches are performed for a base station using a particular search window size. It should be appreciated that other means of limiting such a period may also be used. For example, in one alternative approach, a predetermined number of searches is performed using the corresponding search window size before subsequent processing is undertaken. In another alternative approach, a large change in the measured channel conditions can interrupt the normal process of search window size setting, and ignite a new evaluation of the search window size. Other techniques are also possible.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A mobile communicator comprising:
   a search receiver to search for a base station of interest using a search window size that adapts over time based on a changing channel condition between the base station and the mobile communicator, the search receiver including:

a searcher having a variable size search window; and
a search window size controller to control the variable size search window, said search window size controller to occasionally change the variable size search window to a second search window size that is larger than a first search window size based on a measured channel condition between the base station of interest and the mobile communicator so as to detect received energy from the base station of interest that is outside of the first search window size, wherein the first search window size is less than a full search window size.

2. The mobile communicator of claim 1, wherein:
said search receiver uses the first search window size to search for the base station of interest during normal operation and changes to a third, larger search window size to search for the base station when received energy is detected outside of said first search window size for the base station.

3. The mobile communicator of claim 2, wherein:
said first search window size is selected to encompass at least some possible delay spread conditions between the base station of interest and the mobile communicator.

4. The mobile communicator of claim 1, wherein the search window size controller occasionally changes the variable size search window to the second search window size for use in determining a present channel condition between the base station of interest and the mobile communicator.

5. The mobile communicator of claim 4, wherein:
said search window size controller determines a subsequent search window size for the searcher based on the present channel condition.

6. The mobile communicator of claim 4, wherein:
said second search window size is related to an expected worst case delay spread in the channel between the base station of interest and the mobile communicator.

7. The mobile communicator of claim 4, wherein:
said search window size controller estimates a delay spread of the channel between the base station of interest and the mobile communicator and determines a subsequent search window size for the searcher based on an estimated delay spread of the channel.

8. The mobile communicator of claim 7, wherein:
said search window size controller determines a smallest search window size that encompasses a majority of significant paths within the estimated delay spread of the channel.

9. The mobile communicator of claim 7, wherein:
said search window size controller selects the subsequent search window size from a plurality of predetermined search window sizes.

10. The mobile communicator of claim 4, comprising:
a quality measure unit to determine a quality measure for the base station of interest using an output of the searcher.

11. The mobile communicator of claim 1, wherein:
said search receiver searches for multiple base stations using corresponding search window sizes that adapt over time based on a changing channel condition between each corresponding base station and the mobile communicator.

12. A method for searching for a base station of interest from a mobile communicator, comprising:
searching for the base station of interest using a search window; and
adapting a size of the search window over time based on a changing channel condition between the base station of interest and the mobile communicator, the step of adapting the size of the search window including:
occasionally changing the size of the search window to a second search window size that is larger than a first window size based on a measured channel condition between the base station of interest and the mobile communicator; and
detecting received energy from the base station of interest that is outside of the first search window size, wherein the first search window size is less than a full search window size.

13. The method of claim 12, wherein:
adapting a size of the search window includes:
changing the search window size based on a result of one or more of a plurality of the searches using the second search window size.

14. The method of claim 12, wherein:
adapting a size of the search window includes:
estimating a delay spread of a channel between the base station of interest and the mobile communicator; and
selecting a smallest search window size that encompasses an estimated delay spread, said first search window size corresponding to said smallest search window size.

15. A method for searching for a base station of interest from a mobile communicator, comprising:
searching for the base station using a first search window size;
occasionally changing the first search window size to a second search window size that is larger than the first search window size based on a measured channel condition between the base station of interest and a mobile communicator; and
detecting received energy from the base station of interest that is outside of the first search window size, wherein the first search window size is less than a full search window size; and
searching for the base station of interest for a predetermined period using a third search window size that is greater than said first search window size when significant received energy is detected outside of said first search window size during the step of occasionally changing.

16. The method of claim 15, wherein:
said first search window size is a size that is expected to encompass at least some possible delay spread conditions in a channel between the base station of interest and the mobile communicator; and
said full search window size is a size that is expected to encompass a worst case delay spread condition in the channel between the base station of interest and the mobile communicator.

17. The method of claim 15, wherein:
said third search window size is equal to said full search window size.

18. The method of claim 15, wherein:
said third search window size is less than or equal to said full search window size.

19. The method of claim 15, wherein:
occasionally changing includes changing at regular intervals.

20. The method of claim 15, wherein:
occasionally changing includes estimating a delay spread for the channel between the base station and the mobile communicator; and
said second search window size is determined based upon an estimated delay spread.

* * * * *